United States Patent [19]

Kwan et al.

[11] Patent Number: 5,550,498
[45] Date of Patent: Aug. 27, 1996

[54] METHOD AND APPARATUS FOR CHARGE PULSE-WIDTH MODULATION CONTROL

[75] Inventors: Khang-Shen Kwan; Chean-Lung Tsay; Li-Ming Wu, all of Hsinchu, Taiwan

[73] Assignee: Industrial Technology Research Institute, Chutung Hsinchu, Taiwan

[21] Appl. No.: 521,218

[22] Filed: Aug. 30, 1995

[51] Int. Cl.[6] .................................................. H03K 3/017
[52] U.S. Cl. ............................ 327/175; 327/304; 327/87
[58] Field of Search .............................. 327/77–89, 134, 327/170, 172, 175, 110, 181, 190, 300, 304

[56] References Cited

U.S. PATENT DOCUMENTS 3,596,172  7/1971  Harrison .................................. 323/263
3,766,405  10/1973  Armstrong .............................. 327/175
4,336,512  6/1982  de Vries ................................... 327/175

*Primary Examiner*—Toan Tran
*Attorney, Agent, or Firm*—Beveridge, DeGrandi, Weilacher & Young, LLP

[57] ABSTRACT

A charge mode pulse-width modulation control method and apparatus includes setting up a detector at a primary side of a transformer to detect a current and feeding back the detected current to a current apparatus to provide a current output; an integrator providing charge output with a voltage mode, where the charges are supplied by the integrator which takes the output current of current source to implement mathematical integration, and produce an output voltage and providing the output voltage to a main controller as a reference for deciding whether or not to switch a switch. The control system can prevent the transformer from reaching magnetic saturation and the feedback control current signal from generating noises.

14 Claims, 4 Drawing Sheets

(a)  t

The voltage wave form of primary side (b)  t

The current wave form of primary side (c)  t

The integration wave form of detected current 5,550,498

METHOD AND APPARATUS FOR CHARGE PULSE-WIDTH MODULATION CONTROL

BACKGROUND OF THE INVENTION (a) Field of the Invention

The present invention relates to a method and apparatus for a switching circuit, and more particularly to a control method and apparatus for pulse-width modulation.

(b) Description of the Prior Art

Electrical energy may have different types of conversions depending on needs, in which the action principle of a direct-current—direct-current converter (dc/dc converter) is that a direct-current is used in a high frequency switching mode to generate high frequency alternating-current, and by means of a high frequency transformer, the voltage is stepped Up or down to attain a desired voltage, which voltage will be converted into a direct current output by a rectifier. The relationship and functions of each portion of the above-mentioned circuit are shown in FIG. 1.

A switching circuit has many different changes in application. FIG.1 shows one of the most typical modes of switching circuits, called the full-bridge mode switching circuit. This circuit structure comprises four transistors, Q1, Q2, Q3, and Q4. The action principle is that when the transistor Q1 conducts, the transistor Q2 does not conduct; and when the transistor Q2 conducts, the transistor Q1 does not conduct. The states of the two transistors Q1 and Q2 are complementary. Also, during a certain interval, both Q1 and Q2 do not conduct. Such a time interval is called deadtime. Therefore, point A has two voltage states. The first one is called the "1" state, i.e., when the transistor Q1 conducts. The other one is called the "0" state, i.e., when the transistor Q2 conducts. Likewise, when the transistor Q3 conducts, the transistor Q4 does not conduct; and when the transistor Q4 conducts, the transistor Q3 does not conduct. The states of the transistors Q3 and Q4 are also complementary. The B point between them also has a deadtime, i.e., when both transistors Q3 and Q4 do not conduct, and the above-described "1" and "0" states. Thus, there are four different voltage states, which are (1,1), (1,0), (0, 1), and (0,0). Actually, in the (1, 1) and (0, 0) voltage states, the voltage outputs to the transformer(T) are the same, zero. Therefore, the output electric power has two nonzero states, (1,0) and (0,1), and two zero states, (1,1) and (0,0).

Based on the above-described principle, conventional dc—dc power conversion control methods fall into two main categories: One is control of the output voltage, and the other is control of the output current. All the prior art in relation to these two main categories of control methods utilize the duty cycles of the so-called non-zero states, (1,0) and (0,1), to proceed with a real-time modulation, wherein the former is called voltage-mode control, and the latter is called current-mode control.

The two types of conventional technologies are described in detail in the following books: (1) "Unitegrated Circuits Data Book and Application Note", Unitrode Integrated Circuits Co. May, 1993 and (2) "Power Electronics; Converters, Applications and Design", Mohan, Undeland, Robbin John Willey Sons, Inc., 1989, and (3) Keith H. Billings, "Handbook of Switch Mode Power Supplies", McGraw-Hill Publishing Company, 1989.

Based on the circuit structure as shown in FIG. 1, the waveforms of the voltage and current of the primary side of tranformer(T), i.e., at the A and B terminals, are respectively shown in FIG. 2 and FIG. 3 individually, wherein in FIG. 3 the areas A, B, C, and D, individually show the current waveform formed by the multiplication of the time and the voltage which the transformer receives. Under ideal circumstances, area A is the same as A+ in FIG. 4, and area B is the same as the inverse phase B+ in FIG. 4. But actually, if the positive and negative waves do not balance, the current of FIG. 3 will have a dc low frequency bias to cause imbalance. Then, the primary side of transformer(T) will generate a large direct current, but the waveform shown in FIG. 4 will not be affected to a great extent. Such an imbalance phenomenon usually causes the transformer to become saturated. To prevent the transformer from being saturated, there must be provided a current detector at the primary side of the transformer to detect and control the current, that is to limit the current so that it is balanced at both sides of the zero current. The are a few control methods which utilize the above-mentioned characteristics, wherein the typical method is peak-current mode control. This method primarily consists of detecting the current as shown in FIG. 3. It is used to detect the absolute value of the current. When the detected absolute value is beyond the default one, then it will be determined whether or not to trigger the transistors Q1 and Q4 to be both off, or to trigger the transistors Q2 and Q3 to be both off. Actually, the current signal generated by means of the above method has many noises which usually cause errors.

SUMMARY OF THE INVENTION

A primary object of the present invention is to provide a charge mode pulse-width modulation control method and apparatus that can cause the switching mode electric power transition to achieve the effect of charge balance at positive and negative cycles.

Another object of the present invention is to provide a charge mode pulse-width modulation control method and apparatus to avoid the errors caused by the noises generated in a current, and to further increase the reliability of the circuit.

A further object of the present invention is to provide a charge mode pulse-width modulation control method and apparatus, in which installation is easy and it is unnecessary to be fully isolated from the power source in advance.

Still another object of the present invention is to provide a charge mode pulse-width modulation control method and apparatus for eliminating the problem of the transformer's generating magnetic saturation.

To attain these objects, a preferred embodiment of the present invention includes setting up a detector at a primary side of a transformer to detect current and feeding it back to a current source apparatus to provide current output, an integrator providing charge output with the voltage mode, where the charges are supplied by the integrator which takes the output current of the current source apparatus to implement mathematical integration, and supplies the output voltage to a main controller as a reference voltage for deciding whether or not to proceed with switching a switch. Hence the method and apparatus according to the present invention may help prevent the transformer from reaching magnetic saturation and the feedback control current signal from generating noises.

BRIEF DESCRIPTION OF THE DRAWINGS

The foregoing and other features and advantages of the present invention will be more clearly understood from the following detailed description and the accompanying drawings, in which.

The main difference between the preferred embodiment of this invention and the prior technology is that this invention does not directly utilize the electric current to determine the switching time of the dc—dc converter.

Figure 1:
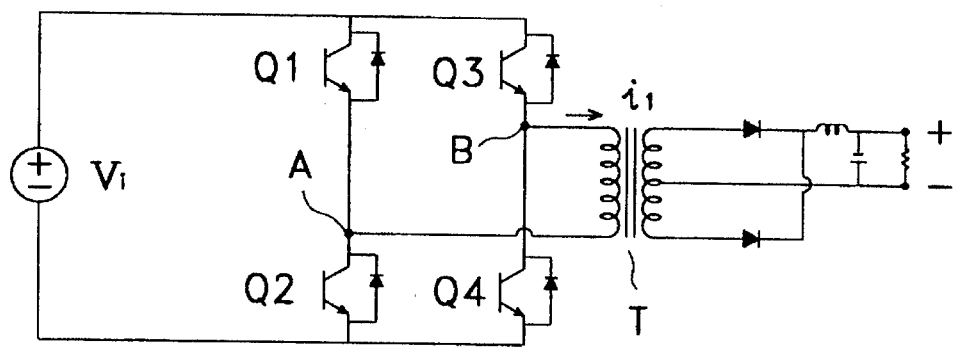
FIG. 1 is a basic circuit diagram of a conventional direct current—direct current electric power converter.
Figure 2:
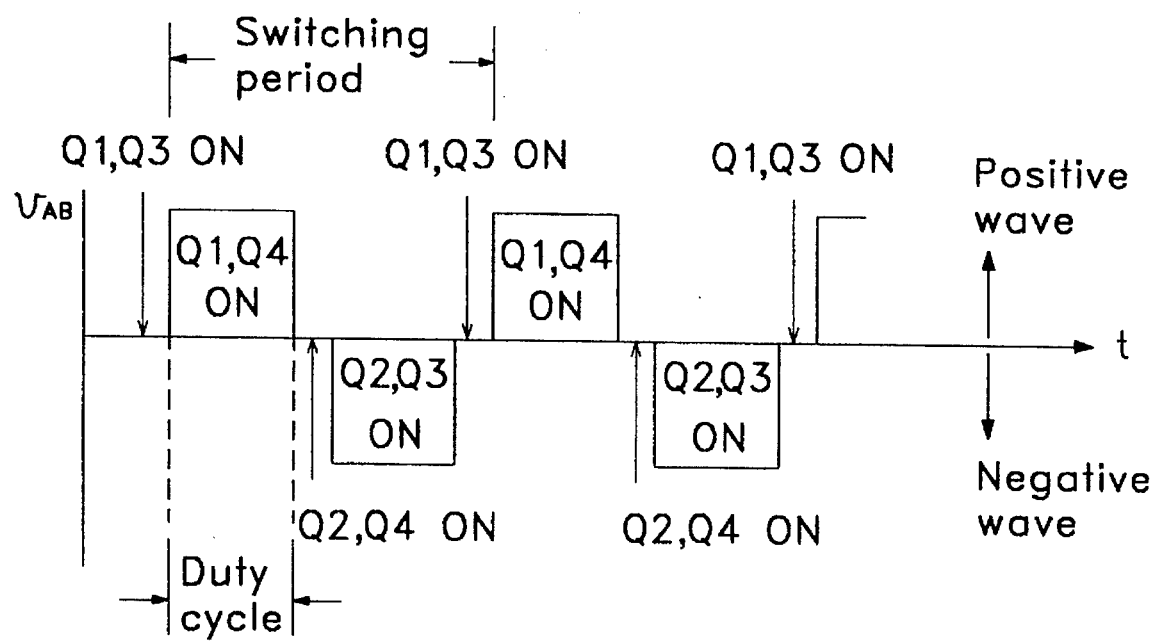
FIG. 2 is a waveform diagram that shows the voltage waveform of the transformer shown in FIG. 1 at a primary side, and the relative states of each transistor switch.
Figure 3:
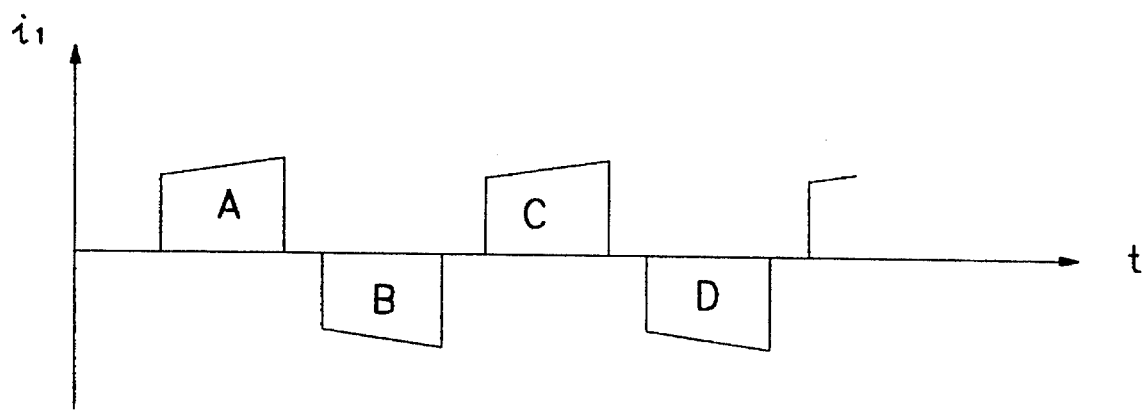
FIG. 3 is a current waveform diagram of the primary side of the transformer shown in FIG. 1.
Figure 4:
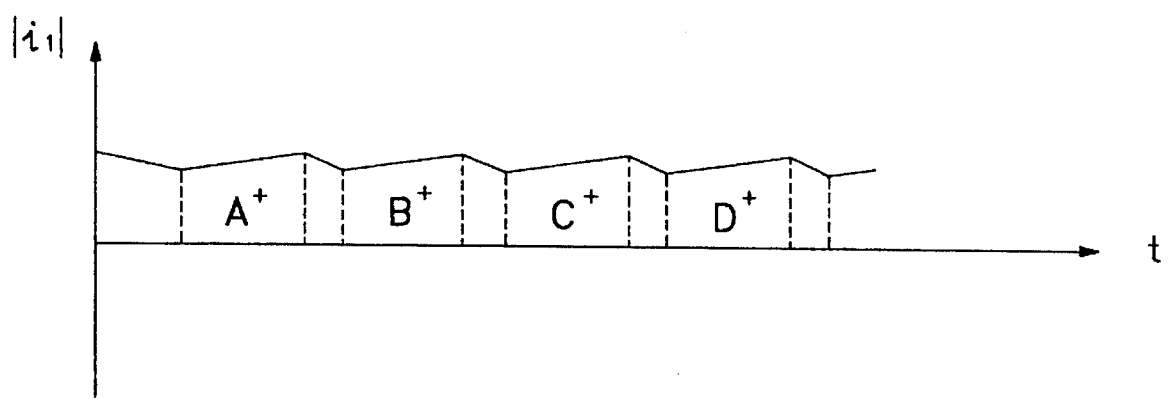
FIG. 4 is a rectified current waveform diagram of FIG. 3.
Figure 5:
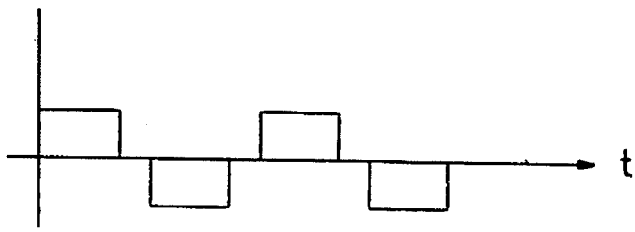
FIG. 5a–5c are a comparison diagram of the detected current/voltage and the mathematical integrated current in the present invention.
Figure 5:
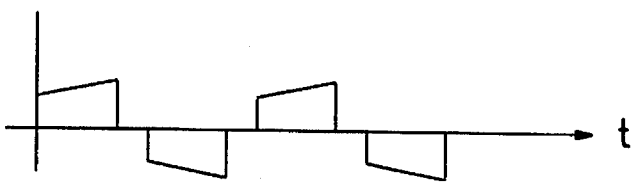
Figure 5:
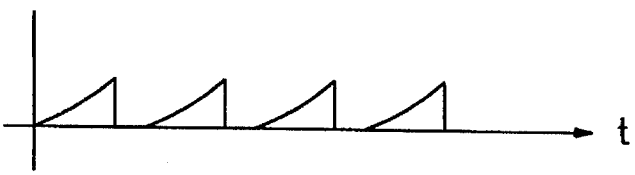
Figure 6:
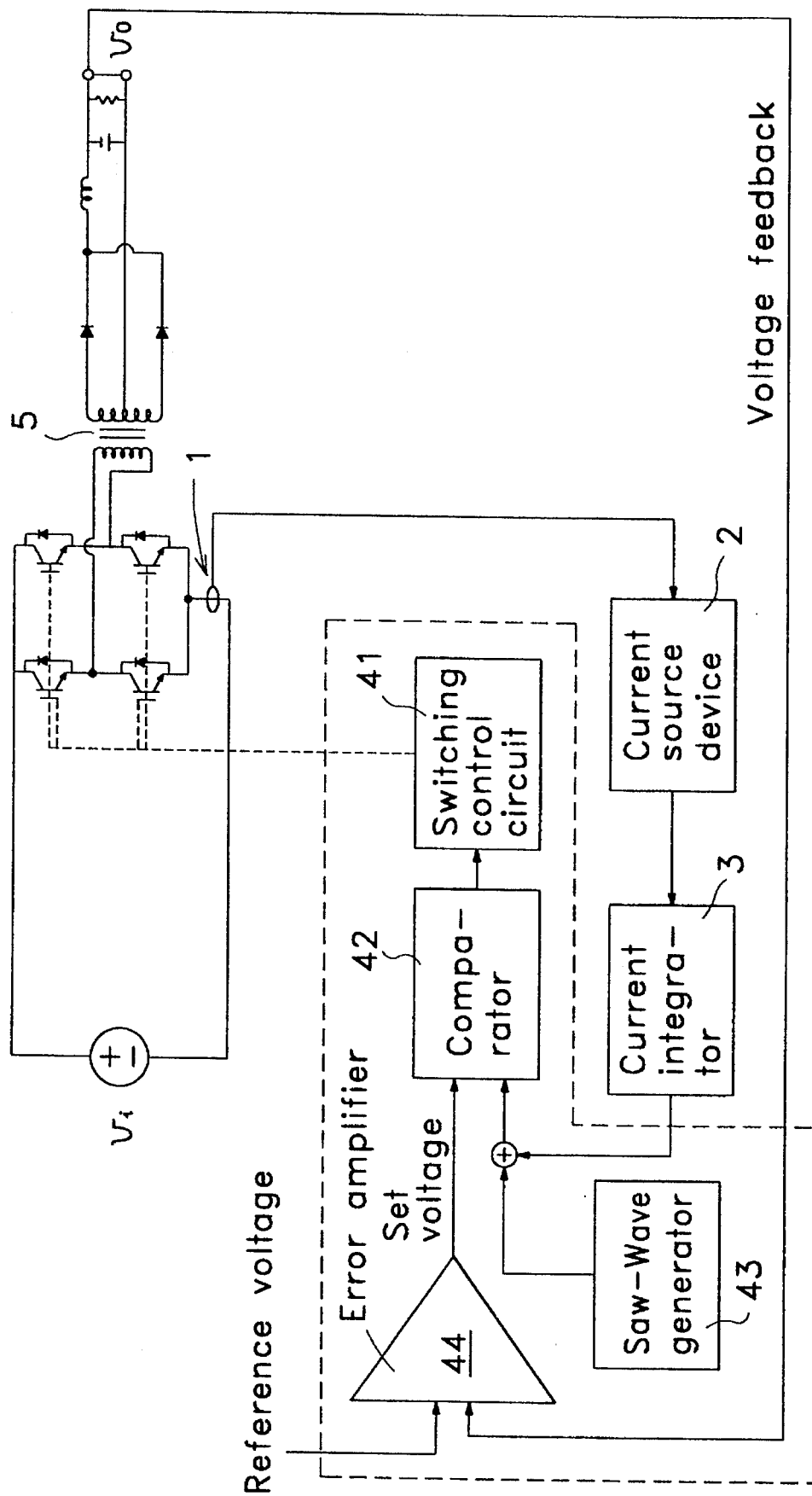
FIG. 6 is a block diagram of a preferred embodiment of a hardware circuit of the present invention.

The method according to the present invention consists of utilizing the detected current which has undergone mathematical integration as a control condition for controlling the switching time. In the present invention, at the dc bus of the primary side of the transformer, there is a current transformer for detecting a direct current source and feeding it back to a current source apparatus to provide a current output. The current source apparatus must be able to provide current output. In FIG. 6, for example a voltage—controlled current source converter is used to convert an input voltage into a current output. The output current is then provided to, for example, an integrator which consists of capacitor components for implementing mathematical integration, and which delivers its output voltage to a main controller as a feedback reference voltage. An integrated circuit (Unitrode UC 3875) may be adopted as the main controller in practice. It includes a switching control circuit. The main controller compares the reference voltage with a set voltage to be the base of a threshold voltage for controlling switching. After the mathematical integration operation, the unnecessary noises can be eliminated from the current to avoid errors and magnetic saturation can be effectively prevented.

To put it concretely, the method according to the this invention comprises: setting up a current source device to provide current output; connecting a current integrator to the output terminal of the current source; setting up a detector at the primary side of a transformer to detect a source and feed back to the current source apparatus for generating current; permitting the integrator to acquire the charges provided by the current source to implement mathematical integration; and comparing the feedback reference voltage from the current integrator output with a set voltage to acquire a threshold charge to control the action of the switch. The set voltage can be amplified in advance and fed back from the secondary side of the transformer. Also, the output reference voltage of the integrator may be made into a saw-wave form by means of a saw-wave generator.

A preferred embodiment of the apparatus according to the present invention is illustrated in FIG. 6. The embodiment of this invention may utilize mathematical integration to enable a switching electric power transition to be charge balanced at positive and negative cycles, preventing errors caused by noises. The preferred embodiment of the apparatus according to this invention comprises: a current transformer containing a detector (1) for detecting the direct current of the primary side of a transformer (5); a current source device (2) connected to the current transformer for providing an output current after processing the detected direct current source; an integrator (3) connected to the current source device (2) for receiving current to implement mathematical integration, and then providing an output voltage; and a main controller (4), which can be a phase shift resonance controller, containing a switching circuit (41). The main controller (4) is connected to the integrator (3) for receiving the output voltage of the integrator (3), and compares the voltage with another received reference set voltage to control the action of a switching control circuit. The main controller (4) in FIG. 6 contains a comparator (42) for comparing the set voltage with the output voltage of the integrator (3), and an error amplifier (44) for amplifying the set voltage before comparison.

A technology of utilizing a charge mode to accomplish switching control of a dc—dc converter has been disclosed in this present invention and works excellently as shown by the above-described example. Although the present invention has been illustrated and described with reference to the preferred embodiment thereof, it should be understood that it is in no way limited to the details of such embodiment but is capable of numerous modifications within the scope of the appended claims.

We claim:

1. A method of controlling a charge mode pulse-width modulation circuit having a transformer, comprising:

detecting a first current at a primary side of the transformer;

producing a second current in response to the first current;

integrating the second current to produce an integrator output voltage;

comparing the integrator output voltage with a set voltage; and employing the result of the comparison to control a switching operation of the charge mode pulse-width modulation circuit.

2. A method according to claim 1, wherein the integrator output voltage is compared with the set voltage by a main controller having phase-shift resonance.

3. A method according to claim 1, wherein the first current is detected at a primary-current bus of the primary side of the transformer.

4. A method according to claim 1, further including:
   amplifying a reference voltage to produce the set voltage.

5. A method according to claim 1, further including;
   amplifying a feedback voltage from a secondary side of the transformer to produce the set voltage.

6. A method according to claim 1, further including:
   converting the integrator output voltage to a saw-wave waveform.

7. An apparatus for controlling a charge mode pulse-width modulation circuit having a transformer, comprising:

a current detector for detecting a first current of a primary side of the transformer;

a current source means, connected to the current detector, for providing a second current after processing the first current from the current detector;

an integrator, connected to the current source means, for integrating the second current from the current source means to provide an integrator output voltage; and a main controller, being connected to the integrator and having a switching control circuit, for comparing the integrator output voltage with a set voltage to control a switch operation of the charge mode pulse-width modulation circuit.

8. An apparatus according to claim 7, wherein the main controller uses a program to control the switching control circuit.

9. An apparatus according to claim 7, wherein the main controller includes a comparator for comparing the integrator output voltage with the set voltage.

10. An apparatus according to claim 7, wherein the main controller is a phase shift resonance controller.

11. An apparatus according to claim 7, wherein the current source means is a voltage-controlled current source convertor for converting the first current into the second current.

12. An apparatus according to claim 7, wherein the integrator includes capacitor elements.

13. An apparatus according to claim 7, wherein the current detector detects the first current at a direct-current bus of the primary side of the transformer.

14. An apparatus according to claim 7, wherein the set voltage is derived from a secondary side of the transformer.

* * * * *